United States Patent Office 2,778,160
Patented Jan. 22, 1957

2,778,160

PRODUCTION OF FOAMED SLAG AND LIKE MATERIAL OF LIGHT WEIGHT

Marcel Gallai-Hatchard, Cheam, England

No Drawing. Application August 29, 1952,
Serial No. 307,155

Claims priority, application Great Britain
September 6, 1951

3 Claims. (Cl. 49—77.5)

The invention relates to a method of producing a new type of foamed slag or like smelt, having a softness, light weight, cellular structure and insulating value not hitherto known nor achieved in the foamed slag industry. The product of the invention has the physical characteristics of the type of light weight aggregates known as "plaster aggregates."

The invention relates to a method developed from the methods described and claimed in the two prior United Kingdom Patents Nos. 563,655 and 608,658, but the invention can be equally applied to any modification of the foaming bed method involving the essential feature of United Kingdom Patent No. 563,655 of a multiplicity of pipes, and jets feeding water under close control to the underside of a molten carpet of the material.

According to the invention of United Kingdom Patent No. 563,655, molten slag is tilted rapidly from slag ladles or slag pots to form a layer or carpet on to the surface of a bed, the base of which is advantageously formed of concrete, and in which are embedded a network of pipes with a multiplicity of nozzles—preferably directed upwards—to safeguard them from the effect of heat and from damage from the slag-clearing grabs and the like. Through the nozzles or jets, water is forced upwardly under pressure against the under surface of the molten slag carpet.

If sand porous aggregate or honeycombed concrete is provided or placed on the concrete base of the bed it serves to retain a sufficient quantity of water, or to maintain a film of water on the top of the foaming surface of the bed. If the film is maintained by a slight but continuous feed from the jets during the pouring, it assists to start off the foaming as soon as the molten slag touches the wet bed surface, while, at the same time, operating to prevent the molten slag baking as a hard crust to the concrete bed. It also serves to prevent explosions which may occur if molten iron or red hot slag skulls or crusts drop into a pool of water.

As soon as the molten slag covers the whole surface of the bed—a matter of seconds—additional large quantities of water are passed under pressure through the jets against the under surface of the slag in sufficient quantities to complete the actual foaming. The water, due to the intense heat of the slag, is converted instantaneously into high pressure steam, which, entrapped by the considerable weight of the slag (each ladle having a capacity of between 7 to 30 tons of molten slag), is prevented from escaping laterally, with the result that the steam is forced upwardly into the slag to inflate or foam it. This method of entrapping the high pressure steam enabled blast furnace slags, hitherto unfoamable by any known mechanical foaming methods, to be satisfactorily foamed.

The foaming up of molten slag is violent and as soon as it reaches its climax there is a very considerable collapse, that is to say, settlement of the foam, apparent immediately. This phenomenon has been accepted in the art as an unavoidable feature of foaming.

I came to the conclusion that the settlement was due to the highly plastic condition of the foam at its moment of origin, and was caused by the weight of the foam pressing down on the still plastic, soft, foam below it until it is chilled by the air to solidification. I have made use of these observations in connection with such types of easily foamable slags, which had hitherto tended to produce a too brittle material. By decreasing the foaming area of the foaming bed, thus allocating more molten slag per sq. foot to the bed area, the compression force exerted by the increased weight of the slag itself—while still in its highly plastic condition—was used to produce a stronger, harder and weightier aggregate.

A further observation utilised to serve a useful purpose was that the chilled crust of the foam formed a heat insulator on top of the foamed carpet, thus enabling the whole mass to remain throughout in full glow, and ensuring uniform undisturbed hardening (annealing) of the material. This proved to be one of the greatest advantages of the foaming system of the prior United Kingdom Patent No. 563,655.

The method of United Kingdom Patent No. 563,655 comprised the following essential steps:

(a) Saturation of the surface of the bed with water and maintaining a thin film of water over the whole bed, not only before, but also during the actual tilting of the molten slag into the bed.

(b) Immediately after the slag has been poured on to the bed to cover it, all the additional water required for the completion of foaming is then passed under pressure through the jets against the undersurface of the molten slag carpet.

In practice it has become customary to regulate the water so that only that amount of water required for complete foaming is added to the slag. Before the climax of foaming a good operator cuts off the water supply so that foaming is completed by the water in the pipe lines and the bed is left dry. The usual drainage means are provided so that any excess water may be drained away to prevent any chilling of the foamed mass. After a few minutes a start may be made to remove the product by grabs, shovels or the like.

In United Kingdom Patent No. 608,658, there is described and claimed an invention by means of which the foamed slag carpet is conveniently broken up after foaming on the bed itself. The invention consists in passing a further volume of water under pressure through the jets in the floor of the bed against the under surface of the foamed carpet, after the hardening (annealing) operation is completed, and while the slag is still glowing or in a hot condition. This addition of water results in the quick chilling, contraction and fissuring of the hot foamed carpet into a blend of useful-sized aggregates without the necessity of mechanical crushing apparatus for the purpose.

The invention of United Kingdom Patent No. 608,658 differs from that of the prior United Kingdom Patent No. 563,655 in that, after the material is annealed it is not cleared for crushing but subjected to a further water treatment to cause it to split up into aggregates of useful size.

Foamed slag, as known hitherto can be defined as a cellular product of reasonable hardness and strength which, when made up with lean cement admixes forms a concrete suitable for the production of load-bearing light-weight building units, blocks, slabs, cast-in-situ walls or for other structural or semi-structural insulating purposes.

The quality of foamed slag suitable for the above mentioned purpose is limited in British standard specification No. 877/1939 to a weight not exceeding 42 lbs. per cubic foot for the ½" to 3/16" grading, which grading was chosen as the "yard-stick" as a basis of comparison for quality. No limit, however, was considered necessary in regard to a minimum weight.

In the British foamed slag industry, however, the average weight limits are set at 30–36 lbs. per cubic foot for coarse gradings (½"–⅛") and 40–45 lbs. per cubic foot for fine (⅛"–dust) gradings, the smaller gradings always being heavier. What the foamed slag trade referred to as a "light" foamed slag was therefore a type weighing between say 28–33 lbs. per cubic foot for the coarse grading (½"–⅛"). Anything below that weight showed a tendency to break up when mixed in an efficient concrete mixer and was therefore considered uneconomical for load-bearing block production, which was the main field for the utilisation of foamed slag.

The weights of the various "expanded slags" produced in the United States in most cases considerably exceed the British weight limits.

In recent years there have appeared on the markets of the United States and Great Britain entirely different, new types of insulating materials consisting of aggregates produced from minerals, which when heated to a determined temperature, expand into bubbles or pearls, or which exfoliate. These aggregates showed considerably lower weight limits per cubic foot than the known aggregates referred to above. These materials are very soft and brittle and can be pulverised between the fingers. They proved therefore of particular importance only where high insulation and very considerable saving of weight were of paramount importance. Their most extensive and successful use was as an aggregate for external rendering or internal plaster finishes having high insulating and fire-resisting properties. These are the aggregates known in the United States as "plaster aggregates" although, for the sake of differentiation within this specification, they could be more adequately termed "non-structural aggregates."

The usefulness of "plaster aggregates" for blocks and slabs however is limited, because on one hand such aggregates break up easily in concrete mixers, and on the other hand, even blocks of limited strength can only be produced at the cost of very rich cement admixtures. Whereas the type of foamed or expanded slag, expanded clay, pumice and like aggregates—all used for light weight concrete blocks—all contributed to the crushing strength of the blocks, the plaster aggregates have no strength of their own. The ultimate strength of the blocks made up with them was the strength of the cement admixture only.

The "plaster aggregates" not only formed an entirely different class with respect to their physical characteristics, but they also belonged to an entirely different price class.

In the United States, where the use of light weight concrete spread far more rapidly than in Great Britain, a committee appointed to draft a new "specification for light weight concrete mineral aggregates" has already found it necessary to suggest a division of the various light weight aggregates into two main weight groups.

Group 1.—Established weight limits between 5–30 lbs./cu. ft.

Group 2.—Weight limits between 20 lbs.–70 lbs./cu. ft.

In view of the great, though rather limited, advantages of the plaster aggregates and their relatively high cost, I carried out experiments to evolve a method of mass-producing a type of "plaster aggregate" by foaming molten blast furnace slag. It sometimes happened in the foaming industry that some lumps of very light and brittle "froth" were foamed on top or at the edges of the foamed masses: in practice, the "froth" becomes blended automatically with the standard material and forms light white or fawnish specks within the mass of the strong, darker, crushed material. The origin of this "froth," or the reason for its formation, were not known, nor had they been investigated or utilised.

As an outcome of my experiments I found that when foaming slag according to the methods of United Kingdom Patents Nos. 563,655 and 608,658, the plasticity of the foamed mass which hitherto resulted in a settling and compression of the mass, leaving the foam in glow for subsequent hardening (annealing), could be utilised in a different manner for a different purpose to produce on a commercial scale a different material, by stabilising the volume of the plastic foam as near to the peak or climax of its volume as possible. This can be achieved as follows:

Instead of shutting-off the water supply before the climax of the foaming is reached, as in the methods of the prior patents, the supply of water is continued and increased.

Thus, not only is the plastic condition which is responsible for the settlement and the weight increasing compression eliminated, but also the glow and thereby the annealing. The product is a wet, highly cellular material with very thin cell walls, which is exceptionally brittle and light in weight; the product is then dried and graded. When dried the product weighs considerably less and has a porosity many times greater than that of the product of the prior patents referred to, in spite of the fact that it is produced from the same type of molten slag.

The stabilisation of volume, or "freezing," may be effected, not only by the application of water, but in any other suitable manner or by any convenient means, as for example by utilising cold air as a chilling medium.

Thus, compared with the operation of the method of the prior United Kingdom Patent No. 563,655, the method according to the invention may follow the first two steps, that is to say, (a) and (b) above referred to. Instead of cutting off the water supply before or when the climax or peak of foaming is reached, the rapid water supply is not only maintained but even increased to effect the "freezing" or stabilising of the plastic foam when it is formed. The usual annealing of the formed slag by gradual cooling is dispensed with as the continued and increased water supply instantly chills the foam, at the same time taking the glow out of it. The sudden chilling, causing sudden contraction, will fissure the material and it will be broken up and separated by the mechanical force of the water supply into small particles.

Comparing the method of the invention with that of British Patent No. 608,658, the difference is that whereas British Patent No. 608,658 applied the water treatment as an entirely separate step after the foamed plastic carpet has settled, solidified and become annealed while left in glow, the method of the invention by continuing and increasing the water supply immediately on the climax of foaming eliminates the plastic condition, the settlement with its compressing effect, and the glow and annealing, the foam being at once split up into soft, small particles.

In order to indicate how the invention is carried into effect, there is now described, one example.

The experiment was carried out on a foaming bed of an area of 24-ft. x 24-ft. which in its main principles is essentially covered by United Kingdom Patent No. 563,655. This particular foaming bed serves for the day to day production of normal foamed slag complying with B. S. S. 877/1939. The molten slag used is derived from foundry iron furnaces and the ladles require about 20–25 minutes to reach the foaming bed. The ladles contain about 7-tons of molten blast furnace slag. The water quantities available in the tank which services the particular foaming bed are sufficient to foam 7-tons of molten slag, and for the splitting up of about one-third of the thickness of the foamed carpet, when producing the standard type of foamed slag. These water quantities were however considered insufficient for carrying out the full and instantaneous chilling of the foam to stabilise the volume according to the method of the present invention. Therefore in order to make the available water quantities suffice for carrying out the experiment, the quantity of molten slag poured over the bed was reduced to somewhere around 3-tons.

After well saturating the surface of the bed with water, the reduced molten slag charge was flushed with a rapid tilt of the ladle over the bed and as soon as the bed was completely covered—which occupied a few seconds—the main water supply valve was well, but not completely, opened, to inject sufficient water under the carpet to cause it to foam up. The slag foamed up, also within a few seconds, as in ordinary foaming, shooting up to its maximum height or peak of about 4 to 4½ feet.

It should be pointed out that the actual thickness of the molten slag carpet when poured over the bed would have been 1" to 1½" had it been left on the bed without foaming it up. The intensity of the foaming up is shown by the fact that 1"-1½" of molten slag was expanded to a height, at the climax of foaming of about 4-ft. As soon as the operator—who has to be alert and quick in action—notices the climax, he opens up the water supply valve fully in order to stabilise by chilling the foam as near to its 4-ft. height as possible, covering with water, within seconds, the whole carpet, in which all glow has been eliminated. The water is then at once rapidly drained off.

In view of the insufficient pressure of the limited water supply, in this experiment, the stabilising effect of the chilling showed variations. Whereas in some places the material showed "peaks" of about 4-ft. height over particularly effective jets, there were partial settlements apparent at about 3-ft.

To produce standard foamed slag on the same bed, 7-tons of molten slag are foamed at one time and reach a climax or height of about 4-ft. the foam then settling within about 25 seconds to an average thickness of about 2-ft. The fact that a reduced quantity of molten slag foamed on the same area produced a carpet, the thickness of which varied at points between 3 and 4-ft. proves the effectiveness of the method and the considerable weight reduction (per volume) of the finished product.

Whereas under normal standard production the carpet which would remain in glow would be of a colour, after cooling, showing various degrees of dark grey, dark brown, the product according to the invention, after draining the bed, showed a nearly uniform light fawnish colour right through its whole thickness with just a few dark pockets. The dark pockets appeared over jets with insufficient water supply which was not enough to eliminate the glow, thus creating "annealed pockets."

The method of the invention therefore, requires a water supply under greater pressure than normal and sufficient to create rapid chilling which should reach every part of the carpet in the quickest possible manner after the climax or peak of foaming has been reached.

The definition of the phrase "stabilising the volume" in this specification and the claims means preventing the volume of the foamed product at the climax or completion of foaming from settling while still in a plastic condition and thus by its weight compressing the material beneath, thus maintaining the light weight of the product.

The product of the method of the invention is therefore a material entirely different in its physical properties from that of the prior patents, being a wet soft unannealed product, as compared with the dry hard annealed product of the known methods.

According to the method of the invention, furthermore, the product after the drying operation may, if desired, be subjected either simultaneously with the drying or subsequently thereto to an annealing treatment for special purposes. In the vicinity of production centres, when the haulage costs of water contained in the material are not of importance, the material can be used just as produced for a number of purposes without previous drying.

The product is of a uniform light colour and of considerably lower weight than had the same molten slag been subjected to the usual foaming methods.

The degree of weight reduction will depend upon and will differ according to the type of blast furnace slag used, its chemical analysis, temperature and so on, but the design of the foaming "apparatus" is the essential deciding factor. Blast furnace slags vary in regard to these properties within wide limits. Therefore it is not possible to set down hard and fast top weight limits which should not be exceeded.

In aiming at a "yard-stick" for the sake of comparison, I found that for this purpose the ½"-⅛" grading would be the most useful. In connection with foundry iron slag—which, for foaming purposes, is one of the most desirable types of blast furnace slags—the lowest limit I achieved for the "yard-stick" grading of ½"-⅛" was a loose weight of 10 lbs. per cubic foot.

As however considerably increased insulation is the main aim in connection with all the non-structural "plaster aggregates," which is expressed in "K" values, I prefer to use this value-expressed in B. t. u.'s/hr./ft.$^2$/° F./in., as my "yardstick." Independent test results on my new foamed slag showed a "K" value of 0.55 B. t. u.'s for a ½ in. dust or "all-in" grading and 0.50 B. t. u.'s for a ½ in., No. 7 B. S. S. sieve no. grading. As the "K" value varies according to grading and the degree of compactness of the individual particles it appeared that the upper limit for the "K" value of the new product in the ½ in. to ⅛ in. grading should be 0.60 B. t. u.'s. It is to be noted that the "K" value of the 10 lbs./cu. ft. (for the yardstick grading) material would be in the neighbourhood of 0.3 B. t. u.'s. The product according to the invention is therefore well within the limits of group 1 of the suggested United States classification referred to above, and is of a kind and quality hitherto unknown in the foamed slag industry.

The method of the invention is, as pointed out above, not limited in its application to apparatus of the kind described in the two United Kingdom patents previously referred to. Whereas these apparatus have been found to be the most suitable for the most efficient and successful production, the method may also be applied to any modification of the foaming bed provided the principles of the multiplicity of pipes and jets contained in the bed as described above are adopted.

The product has a further great advantage as compared with the hitherto known foamed slag aggregates. Due to the intensive chilling in its production it is in fact a cellular "glass" which is the same physical condition as required in the production of blast furnace Portland cement from granulated slag. Thus the product of the invention has considerable cementitious qualities of its own when used as an aggregate in concrete, requiring a less proportion of Portland cement than other non-cementitious special light weight aggregates.

Summing up, the advantages of the method and the material produced hereby, are as follows:

(1) The method can be used with best results in connection with foaming beds of the kind described in the prior United Kingdom Patent No. 563,655, but it can also be used with modified foaming beds.

(2) With suitable means and materials weights can be reduced down to about 10 lbs. per cubic foot in the ½"-⅛" grading with K values of 0.3 B. t. u.'s. With less suitable means and materials there will also be a great weight-reducing effect, even if not quite to the same substantial degree.

(3) The product is a soft, highly cellular foamed product, useful for the same purposes as the "plaster aggregates" hitherto known, but at considerably less cost.

(4) The product is a mass-produced article, and can therefore be used as a blend with the heavier types of mass-produced light-weight aggregates.

(5) The product has considerable hydraulic properties of its own.

I claim:
1. A method for producing a foamed aggregate from molten blast furnace slag and like smelts comprising pouring a layer of molten slag onto a substantially level surface, passing a foaming agent upwardly into the molten slag from underneath to completely foam the slag to its peak volume and continue passing this agent without interruption as a rapid chilling medium at an increased pressure and volume to substantially penetrate throughout the foamed slag to stabilize the volume of the foam at approximately the peak of foaming before any settling occurs.

2. A method for producing a foamed aggregate from molten blast furnace slag and like smelts comprising pouring a layer of molten slag onto a substantially level surface, passing water upwardly into the molten slag from underneath to completely foam the slag to its peak volume and continue passing water without interruption at an increased pressure and volume to substantially penetrate throughout the foamed slag to effect substantially instantaneously the solidification of the foam by rapid chilling before any settling occurs to stabilize the volume of the foam at approximately the peak of foaming.

3. A method for producing a foamed aggregate from molten blast furnace slag and like smelts comprising substantially instantaneously pouring a layer of molten blast furnace slag onto a substantially level water moistened surface, passing a quantity of water upwardly into and throughout the layer of molten slag from underneath at a plurality of spaced points to completely foam the molten slag to its peak volume and continue passing additional quantities of water without interruption at an increased pressure and volume to effect substantially instantaneously the foamed slag to effect substantially instantaneously the solidification of the foam by rapid chilling before any settling occurs to stabilize the volume of the foam at approximately the peak volume of the foam.

References Cited in the file of this patent

UNITED STATES PATENTS

| | | |
|---|---|---|
| 1,163,605 | Schol | Dec. 7, 1915 |
| 1,920,728 | Wiegel | Aug. 1, 1933 |
| 2,443,103 | Gallai-Hatchard | June 8, 1948 |
| 2,460,742 | Gallai-Hatchard | Feb. 1, 1949 |

FOREIGN PATENTS

| | | |
|---|---|---|
| 457,707 | Great Britain | Dec. 3, 1936 |

OTHER REFERENCES

"Foamglass," 1942, publ. by Pittsburgh Corning Corp., Pittsburgh; Listing of physical properties on rear cover.

Perry: Chemical Engineers Handbook, 3rd. ed., 1950, pages 456-7.